United States Patent [19]

Yamauchi

[11] Patent Number: 4,840,135
[45] Date of Patent: Jun. 20, 1989

[54] SEWING MACHINE CONTROLLER INHIBITING SEWING IN UNSAFE CONDITIONS

[75] Inventor: Satomi Yamauchi, Aichi, Japan

[73] Assignee: Mitsubishi Denki Kabushiki Kaisha, Tokyo, Japan

[21] Appl. No.: 165,824

[22] Filed: Dec. 29, 1987

Related U.S. Application Data

[62] Division of Ser. No. 937,281, Dec. 3, 1986, abandoned.

[30] Foreign Application Priority Data

Dec. 3, 1985 [JP] Japan .................................. 60-272005
Dec. 3, 1985 [JP] Japan .................................. 60-272006

[51] Int. Cl.⁴ ............................................. D05B 69/36
[52] U.S. Cl. ..................................... 112/277; 112/237; 192/130
[58] Field of Search ............... 112/237, 239, 277, 275, 112/121.11; 192/130

[56] References Cited

U.S. PATENT DOCUMENTS

| | | | |
|---|---|---|---|
| 2,418,356 | 4/1947 | Kleber | 192/130 X |
| 3,777,685 | 12/1973 | Baruffa | 112/237 X |
| 3,953,770 | 4/1976 | Hayashi | 112/277 |
| 4,457,245 | 7/1984 | Odermann | 112/237 X |
| 4,459,927 | 7/1984 | Kurland | 112/237 |
| 4,567,838 | 2/1986 | Vogel | 112/237 |

FOREIGN PATENT DOCUMENTS 6022958 6/1985 Japan .................................. 112/271

Primary Examiner—Peter Nerbun
Attorney, Agent, or Firm—Sughrue, Mion, Zinn, Macpeak & Seas

[57] ABSTRACT

A sewing machine controller which inhibits compensation sewing if the cloth presser is raised, if the treadle switch is activated or a proximity switch mounted near the needle detects the operator's hand.

3 Claims, 1 Drawing Sheet

SEWING MACHINE CONTROLLER INHIBITING SEWING IN UNSAFE CONDITIONS

This is a divison of application Ser. No. 937,281, filed 12/3/86, now abandoned.

BACKGROUND OF THE INVENTION

1. Field of the Invention

This invention relates to a sewing machine controller for controlling an electric sewing machine.

2. Background of the Invention

Generally, in industrial sewing machines, a motor is rotated and driven by means of a treadle switch or the like, and sewing is performed by the motive power of the motor. A compensation sewing switch is mounted on a sewing machine head so as to perform compensation or one-needle sewing.

In the prior art, a piece of cloth is moved in a parallel or rotary direction in order to change the sewing point of the cloth. This movement is made after the motor is stopped and then a cloth presser is lifted. In this case, if the cloth or the hand of an operator touches the compensation sewing switch, the compensation sewing switch is turned on, and the compensation sewing is started with the cloth presser being lifted. Further, when a yarn is inserted into a needle, there is a possibility that the hand of the operator also touches the compensation switch to thereby start the compensation sewing operation inadvertently. Needles to say, these are dangerous situations.

SUMMARY OF THE INVENTION

An object of the invention is to solve the problem of the prior art and to obtain a controller that provides a safe sewing machine.

The sewing machine controller according to the invention comprises a means for inhibiting the motor rotating command either during the lifting operation of the cloth presser or when a proximity switch is actuated by the operator's hand.

Thus, the motor is not rotated during the lifting operation of the cloth presser even when the compensation sewing switch is turned on by mistake or when the operator accidentally comes near the proximity switch.

DETAILED DESCRIPTION OF THE PREFERRED EMBODIMENTS

Figure 1:
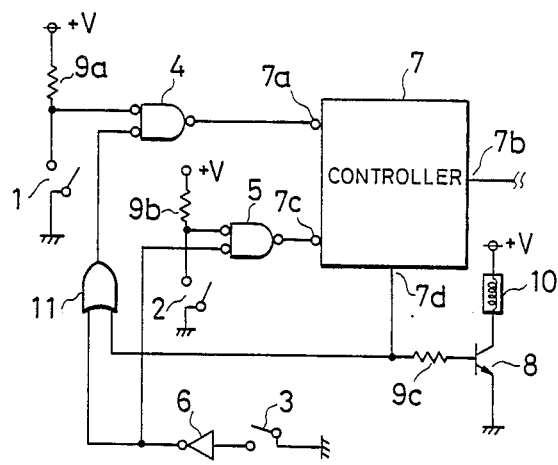
FIG. 1 is a circuit diagram of one embodiment of the invention.

FIG. 1 is a circuit diagram showing one embodiment of the invention. A compensation sewing switch 1 controls compensation sewing. Japanese paid-open Patent Application (OPI) No. 33980/83 discloses a sewing start signal $S_1$ corresponding to the signal output by the compensation sewing switch 1. When the sewing start signal of "1" is generated, the sewing machine starts. However, there is no disclosure there of inhibiting the sewing start signal. Returning to FIG. 1, a cloth presser lifting switch 2 controls the lifting operation of the cloth presser when the cloth presser lifting switch 2 is turned on. A treadle switch 3 is depressed during the sewing operations. Two AND gates 4 and 5 with inverted inputs and outputs process switching signals from the switches 1, 2 and 3. The output of the treadle switch 3 is inverted by an inverter 6. The switching signals are supplied to a controller 7 which supplies through a transistor 8 and a resistor 9c control signals to a solenoid 10. The solenoid 10 controls the lifting and downward moving operations of the cloth presser. An OR gate 11 receives the solenoid control signal and the inverted treadle switch signal. A compensation sewing command signal is outputted from a terminal 7b by the controller 7 when a "0" level signal is applied to a terminal 7a by the AND gate 4 receiving signals from the OR gate 11 and the compensation sewing switch 1, which switches a pull-up resistor 9a. A "1" level hook up signal for the solenoid 11 is outputted from a terminal 7d by the controller 7 when a "0" level signal is applied to a terminal 7c which receives signals from the AND gate 5, receiving the inverted treadle switch signal and a signal from the cloth presser switch 2, which switches a pull-up resistor 9b. A "0" level signal is outputted from the terminal 7d when a "1" level signal is applied to the terminal 7c.

The operations of the above constituted apparatus will now be described. It is assumed for compensation sewing and presser lifting that the treadle switch 3 should remain open. When the cloth presser switch 2 is turned off, when the cloth presser is moved downward, the "0" level signal is outputted from the terminal 7d to the solenoid 10 because the terminal 7c is at the "1" level. In this condition, when the compensation sewing switch 1 is turned on, the AND gate 4 outputs the "0" level signal to the terminal 7a, and the compensation sewing command signal is outputted from the terminal 7b to a driving part (not shown) to perform the compensation sewing.

When the cloth is to be moved or rotated to change the sewing point, the cloth presser switch 2 is turned on, the "0" level signal is applied to the terminal 7c, and the "1" level signal is outputted from the terminal 7d to make the transistor 8 conduct, and the solenoid 10 is driven to lift the cloth presser. In this condition, the operator can move or rotate the cloth to a desired position. If the cloth or the hand of the operator touches the compensation sewing switch 1 in error, the "0" level signal to perform the compensation sewing is applied to one terminal of the AND gate 4 from the compensation sewing switch 1. However, the "1" level signal, used for raising the cloth presser, is applied to the other terminal of the AND gate 4 from the terminal 7d. Therefore, the "0" level signal from the compensation sewing switch 1 is not applied to the controller 7, so that the compensation sewing is not performed even when the compensation sewing switch 1 is turned on in error.

Lifting the needle, cutting yarn, positioning the needle to a neutral position, or increasing the needle speed is selected by changing the operating direction of the treadle switch. Therefore, when the operation of lifting the needle or cutting the yarn is performed and the "0" level signal is outputted from the treadle switch 3, the compensation sewing switch 1 may be turned on in error. In this case, the "0" level signal from the treadle switch 3 is inverted by the inverter 6, and the "1" level signal is applied to the AND gate 4 through the OR gate 11, so that the signal from the compensation sewing switch 1 is not allowed to reach to the controller 7. The signal from the inverter 6 is also applied to the AND gate 5, so that the cloth presser cannot be lifted while the treadle switch 3 is treadled.

The above embodiment is electrically processed. The cotnroller according to the invention, however, may be mechanically processed by being interlocked with the cloth presser.

According to the invention as described above, sicne the motor is not rotated while the cloth presser is controlled and lifted with the cloth presser lifting switch, the safety of the operations can be obtained.

Figure 2:
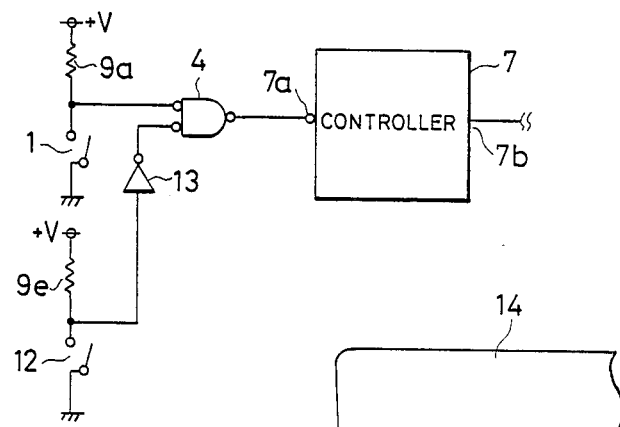
FIG. 2 is a circuit diagram of another embodiment of the invention.

Another embodiment of the invention is shown in FIG. 2 in which part similar to those of FIG. 1 are referenced by like reference numerals. This embodiment includes the compensation sewing switch 1. A proximity switch 12 is mounted on a sewing machine head. An inverter 13 inverts the output of the proximity switch 12, which switches a pull-up resistor 9e. A "0" level signal is outputted from the proximity switch 12 when the hand of the operator approaches to the area centered around the needle (not shown).

The operations of the above constituted apparatus will be described hereinunder. Since the "1" level signal is outputted from the open proximity switch 12 during the normal operation, this signal is inverted by the inverter 4, and the "0" level signal is applied to one terminal of the AND gate 4. In this case, when the compensation switch 1 is turned on, the "0" level signal is applied to the other terminal of the AND gate 4, and the resultant "0" level signal is applied to the controller 7. Accordingly, the compensation sewing signal is applied to a driving circuit (not shown) from terminal 7b of the controller 7, and the compensation sewing operation is performed.

When the hand of the operator approaches to the needle so as to insert the yarn into the needle or to perform other operation, the proximity switch 12 detects the hand and outputs the "0" level signal. This "0" level signal is inverted by the inverter 13, and the "1" level signal is applied to one terminal of the AND gate 4. In this case, if the hand of the operator touches the compensation sewing switch 1 in error and the switch 1 is turned on, the "0" level signal outputted from the switch 1 to perform the compensation sewing is applied to the other terminal of the logical circuit 3. However, the "1" level signal is applied to one terminal of the AND gate 4 from proximity switch 12 through the inverter 13, so that the "0" level signal from the switch 1 is inhibited and is not applied to the controller 7. Therefore, the compensation sewing is not performed even if the compensation switch 1 is turned on by mistake.

Figure 3:
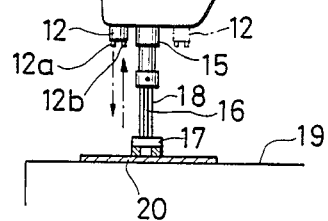
FIG. 3 is a schematic diagram illustrating a side view of a sewing machine.

The above described proximity switch 12 will be described in detail with reference to FIG. 3. FIG. 3 is a schematic diagram illustrating a side view of a sewing machine.

In FIG. 3, the sewing machine head, needle bar, needle and cloth presser are designated by reference numerals 14, 15, 16 and 17, respectively. A presser bar 18 couples the cloth presser 17 to the sewing machine head 14, which is moved upwardly or downwardly by a driven such as a solenoid provided to the sewing machine head 14. A cloth 20 to be sewed is placed on a sewing table 19.

The proximity switch 12 includes a pair of a light emitting element 12a emitting a light downwardly and a light receiving element 12b receiving a light reflected by the table 19 and cloth 20. The proximity switch 12 is mounted on the sewing machine head 14 in the vicinity of the reciprocating needle bar 15 as shown in FIG. 3. When the hand of the operator enters in a certain detecting area from the reciprocating needle 16, the proximity switch 12 operates to detect the approach of the operator's hand based on such a variation in a reflection condition as that in the amount of the reflected light received by the light receiving element 12b. Upon detection of the approach of the operator's hand, the proximity switch 12 produces the "0" level output signal. A plurality of proximity switches may be provided in order to increase the detection accuracy.

In the above embodiment of the invention, the compensation sewing is inhibited by means of the proximity switch. When the proximity switch, however, is turned on, both of the signals from the compensation sewing and the treadle switches may be inhibited by similar circuitry, or the driving function of the sewing machine may be stopped.

According to the invention as described above, since the command from the rotation command switch is inhibited when the hand of the operator enters in the detecting area of the proximity switch, the safety of the operation can be increased.

What is claimed is:

1. A sewing machine controller having an automatic lifting mechanism for a cloth presser, comprising:
   a first switch for controlling the rotation of a sewing machine motor shaft via a rotation command signal;
   means for detecting conditions dangerous to an operator of said sewing machine;
   means for inhibiting said rotation command signal responsive to an ouptut of said detecting means;
   means for raising said cloth presser of said sewing machine; said detecting means detecting a raising of said cloth presser;
   a treadle switch; and
   means for inhibiting said cloth presser raising means upon closure of said treadle switch.

2. A sewing machine controller having an automatic lifting mechanism for a cloth presser, comprising:
   a controller;
   a first AND gate;
   a second AND gate;
   an OR gate having its output connected to an input of said first AND gate;
   an inverter having its output connected to an input of said OR gate and an input of said second AND gate;
   a compensation sewing switch connected to another input of said first AND gate;
   a cloth presser lifting switch connected to another input of said second AND gate;
   a treadle switch connected to the input of said inverter;
   a controller which receives the outputs of said first AND and said second AND gate;
   a solenoid;
   switch means;
   wherein said controller supplies control signals to said solenoid through said switch means in response to the inputs from said first and second AND gates; and
   said solenoid controls the lifting and downward moving operations of said cloth presser.

3. A sewing machine controller having an automatic lifting mechanism for a cloth presser, comprising:

first switch means for selectively delivering a first signal for placing said sewing machine in a first sewing mode;

second switch means for selectively delivering a second signal for placing said sewing machine in a second sewing mode;

means for generating a cloth presser raise signal for raising said cloth presser of said sewing machine; and control means for controlling the operation of said sewing machine, said control means receiving said first signal, said second signal and said cloth presser raise signal;

said control means preventing said cloth presser from being raised when said second signal and said cloth presser raise signal are both present, and preventing said sewing machine from entering said first sewing mode when either of said cloth presser raise signal and said second signal is present.

* * * * *